US008712659B2

(12) United States Patent
Kieren et al.

(10) Patent No.: US 8,712,659 B2
(45) Date of Patent: Apr. 29, 2014

(54) METHOD AND APPARATUS FOR ELIMINATING A MOTOR VEHICLE TIP-OVER RISK

(75) Inventors: Martin Kieren, Marbach A.N (DE); Gero Nenninger, Tamm (DE); Matthew Nimmo, Ludwigsburg (DE); Flavio Nardi, Farmington Hills, MI (US); Wadim Napolskich, Ludwigsburg (DE); Andris Samsons, Kalamazoo, MI (US)

(73) Assignee: Robert Bosch GmbH, Stuttgart (DE)

( * ) Notice: Subject to any disclaimer, the term of this patent is extended or adjusted under 35 U.S.C. 154(b) by 1456 days.

(21) Appl. No.: 11/659,907

(22) PCT Filed: Jul. 4, 2005

(86) PCT No.: PCT/EP2005/053155
§ 371 (c)(1),
(2), (4) Date: Mar. 11, 2008

(87) PCT Pub. No.: WO2006/018349
PCT Pub. Date: Feb. 23, 2006

(65) Prior Publication Data
US 2008/0262686 A1    Oct. 23, 2008

(30) Foreign Application Priority Data

Aug. 19, 2004 (DE) .......................... 10 2004 040 140

(51) Int. Cl.
*B60T 8/1755* (2006.01)
(52) U.S. Cl.
USPC .................. 701/70; 701/36; 701/45; 701/48; 701/72; 701/78; 701/82; 701/83

(58) Field of Classification Search
USPC ......... 280/29, 727–757; 701/1, 29–49, 69–92
See application file for complete search history.

(56) References Cited

U.S. PATENT DOCUMENTS

| | | | | |
|---|---|---|---|---|
| 5,116,078 | A | * | 5/1992 | Kanazawa et al. ......... 280/5.503 |
| 5,482,361 | A | * | 1/1996 | Burckhardt et al. .......... 303/186 |
| 5,540,298 | A | * | 7/1996 | Yoshioka et al. ............. 180/169 |
| 5,636,907 | A | * | 6/1997 | Okazaki et al. ................ 303/10 |
| 5,702,165 | A | * | 12/1997 | Koibuchi ..................... 303/146 |
| 6,185,497 | B1 | * | 2/2001 | Taniguchi et al. .............. 701/70 |
| 6,304,805 | B1 | * | 10/2001 | Onogi .............................. 701/36 |
| 6,322,167 | B1 | * | 11/2001 | Pruhs et al. ................... 303/146 |
| 6,349,247 | B1 | * | 2/2002 | Schramm et al. ................. 701/1 |
| 6,416,141 | B1 | * | 7/2002 | Zinnkann et al. ............. 303/191 |
| 6,493,621 | B2 | * | 12/2002 | Tamura et al. .................. 701/70 |

(Continued)

FOREIGN PATENT DOCUMENTS

| | | |
|---|---|---|
| CN | 1439556 | 9/2003 |
| DE | 199 07 633 | 10/1999 |

(Continued)

*Primary Examiner* — Jonathan M Dager
(74) *Attorney, Agent, or Firm* — Kenyon & Kenyon LLP

(57) ABSTRACT

The invention relates to a method for preventing tip-over of a motor vehicle in the lateral direction,
  in which a finite number of predefined driving states is specified;
  in which a determination is made as to which of the predefined driving states the vehicle is in instantaneously, the predefined driving state thus determined being dependent on sensor signals and on that predefined driving state in which the vehicle was most recently; and
  as a function of the predefined driving state instantaneously present, at least one braking intervention is carried out in order to prevent the tip-over.

23 Claims, 3 Drawing Sheets

(56) References Cited

U.S. PATENT DOCUMENTS

| | | | |
|---|---|---|---|
| 6,494,281 | B1 | 12/2002 | Faye et al. |
| 6,523,914 | B2* | 2/2003 | Poggenburg et al. ......... 303/146 |
| 6,756,890 | B1* | 6/2004 | Schramm et al. ............. 340/440 |
| 6,978,200 | B2* | 12/2005 | Ide et al. ......................... 701/45 |
| 6,984,005 | B2* | 1/2006 | Meyer et al. .................. 303/186 |
| 7,149,614 | B2* | 12/2006 | Traechtler et al. ............. 701/38 |
| 7,493,204 | B2* | 2/2009 | Yano .............................. 701/70 |
| 7,848,866 | B2* | 12/2010 | Nimmo et al. ................. 701/70 |
| 8,145,386 | B2* | 3/2012 | Harase et al. .................. 701/45 |
| 2001/0029438 | A1* | 10/2001 | Tobaru et al. ................ 702/151 |
| 2001/0037677 | A1 | 11/2001 | Holst et al. |
| 2001/0038202 | A1* | 11/2001 | Tobaru et al. ................ 280/805 |
| 2002/0010535 | A1* | 1/2002 | Nishio ............................ 701/70 |
| 2002/0013645 | A1* | 1/2002 | Badenoch ....................... 701/37 |
| 2002/0087235 | A1* | 7/2002 | Aga et al. ......................... 701/1 |
| 2002/0173882 | A1* | 11/2002 | Tobaru et al. ..................... 701/1 |
| 2003/0158633 | A1* | 8/2003 | Schubert ............................ 701/1 |
| 2003/0225499 | A1* | 12/2003 | Holler ............................. 701/71 |
| 2004/0026151 | A1* | 2/2004 | Ogata et al. ................... 180/282 |
| 2005/0004730 | A1* | 1/2005 | Suzuki et al. ................... 701/38 |
| 2007/0168098 | A1* | 7/2007 | Lich et al. ...................... 701/46 |
| 2007/0282510 | A1* | 12/2007 | Nimmo et al. ................. 701/70 |
| 2012/0004819 | A1* | 1/2012 | Lu et al. .......................... 701/70 |

FOREIGN PATENT DOCUMENTS

| | | |
|---|---|---|
| DE | 101 28 357 | 3/2003 |
| EP | 1 338 490 | 10/2002 |
| JP | 11-117784 | 4/1999 |
| JP | 2002503185 | 1/2002 |
| JP | 2002-205632 | 7/2002 |
| WO | WO 02/100696 | 12/2002 |

\* cited by examiner

METHOD AND APPARATUS FOR ELIMINATING A MOTOR VEHICLE TIP-OVER RISK

FIELD OF THE INVENTION

The present invention relates to a method for preventing tip-over of a motor vehicle in the lateral direction.

BACKGROUND INFORMATION

DE 101 35 020 A1 discloses a method and an apparatus for detecting and eliminating a tip-over risk of a motor vehicle equipped with a regulation system, about a vehicle axis oriented in the vehicle's longitudinal direction. In this, a variable describing the transverse dynamics of the vehicle is ascertained and is compared with a threshold value. In the event the threshold value is exceeded, the set of all possible combinations of output signal values deliverable by the regulation system to actuators for stability regulation is limited.

SUMMARY OF THE INVENTION

The present invention relates to a method for preventing tip-over of a motor vehicle in the lateral direction,
  in which a finite number of predefined driving states is specified;
  in which a determination is made as to which of the predefined driving states the vehicle is in instantaneously
  the predefined driving state thus determined being dependent on sensor signals and on that predefined driving state in which the vehicle was most recently; and
  as a function of the predefined driving state instantaneously present, at least one braking intervention being carried out in order to prevent the tip-over.

As a result, regulation is influenced not only by the present vehicle-dynamics situation, but also by its previous history. This allows regulation to be better adapted to the overall driving situation.

An advantageous embodiment of the invention is characterized in that the sensor signals are at least the yaw rate, the transverse acceleration, the steering angle, and the wheel rotation speeds. These signals are usually available in a vehicle dynamics regulation system.

An advantageous embodiment of the invention is characterized in that the sensor signals additionally encompass the accelerator pedal position stipulated by the driver, as well as the brake pre-pressure stipulated by the driver.

An advantageous embodiment of the invention is characterized in that in at least one of the predefined driving states, in a cornering situation the front wheel on the outside of the curve is braked.

An advantageous embodiment of the invention is characterized in that in at least one of the predefined driving states, a pre-filling of at least one wheel brake cylinder takes place, with which, however, no appreciable braking effect is applied. This makes possible a shorter braking reaction time.

An advantageous embodiment of the invention is characterized in that the predefined states are the states of a state machine.

The invention further encompasses an apparatus for preventing tip-over of a motor vehicle in the lateral direction,
  in which a finite number of predefined driving states is specified;
  which contains sensor means for sensing vehicle-dynamics variables;
  which contains driving state determining means with which a determination is made as to which of the predefined driving states the vehicle is in instantaneously,
  the predefined driving state thus determined being dependent on the sensor signals determined with the sensor means and on that predefined driving state in which the vehicle was most recently; and
  contains braking means with which, as a function of the predefined driving state instantaneously present, at least one braking intervention is carried out in order to prevent the tip-over.

An advantageous embodiment of the invention is characterized in that the apparatus is part of a vehicle dynamics regulation system.

The advantageous embodiments of the method according to the present invention are, of course, also expressed as advantageous embodiments of the apparatus according to the present invention, and vice versa.

BRIEF DESCRIPTION OF THE DRAWINGS

The drawings are made up of FIGS. 1 to 5.

DETAILED DESCRIPTION OF THE DRAWINGS

Figure 1:
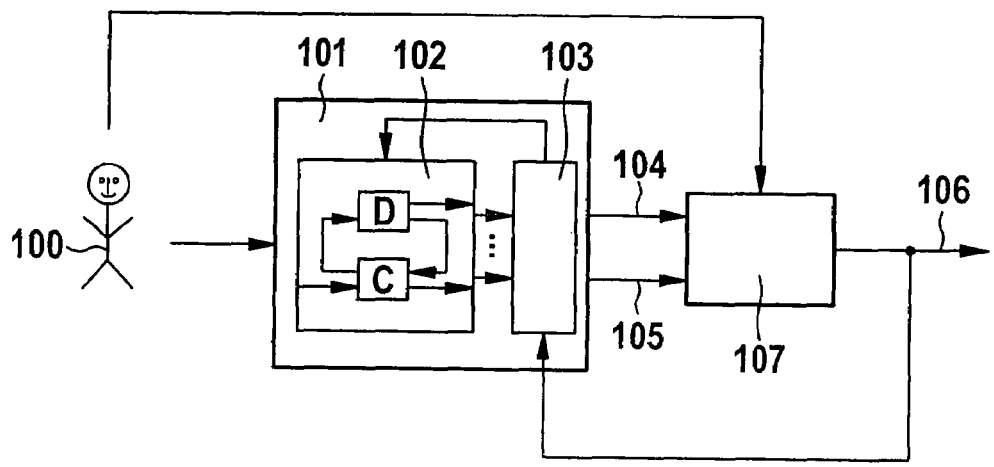
FIG. 1 shows the configuration of the invention.

The present invention is based on the fact that all possible driving maneuvers or driving states of the vehicle are divided into a finite number of classes in terms of their significance in connection with the tip-over risk in highly dynamic driving situations. Each possible driving state has exactly one class allocated to it. The vehicle is therefore always, depending on the driving state, in exactly one of the classes. Transition criteria are furthermore defined for each possible transition from one class to another class, e.g. from class A to class B. If these transition criteria are met, for example, for the transition from class A to class B, a vehicle whose driving state was previously allocated to class A is therefore now in class B.

The present invention thus creates a regulation strategy for tip-over stabilization by dividing the possible driving maneuvers into suitable classes, each class having assigned to it an intervention strategy for vehicle stabilization (e.g. suitable braking or engine-torque interventions). Advantageously, with regard to the sensors, only the sensors contained in a vehicle dynamics regulation system are to be resorted to for allocation of the driving maneuvers to the respective classes. These sensors are principally wheel rotation speed sensors, a transverse acceleration sensor, a yaw rate sensor, and a steering angle sensor.

The sensor signals are processed, for this purpose, in a so-called hybrid state machine. The hybrid state machine uses both driver inputs and vehicle-dynamics variables of the vehicle in order to enter discrete states, leave them, and transition from one discrete state to another. Each discrete state represents one specific phase of a driving situation.

Because the discrete states have specific entry criteria, the use of a state machine in the electronic stability program (ESP) control unit results in a kind of "memory" for the control unit. The output of the state machine are both discrete and continuous variables that are used to regulate the braking torque or wheel slip of individual wheels.

The use of a state machine to identify hazardous driving situations allows the ESP control unit to decide which wheel requires intervention and at what intensity.

Typical driving maneuvers can be subdivided, for example, into the following groups:

driving maneuvers that contain a first steering-input action by the driver, e.g. a J-turn maneuver, driving through a curve having a decreasing radius, but also fishhook maneuvers, lane changes, etc.;

driving maneuvers with a steering-back action, for example steering into the swerve section in the context of a lane change, or steering back after the first holding phase in the context of a fishhook maneuver;

driving maneuvers having triple or multiple alternate steering actions.

Each steering action, and indeed each time segment of the steering action, is characterized by typical driver inputs (in particular via the steering wheel) and typical vehicle reactions. Each dynamic steering maneuver can therefore be divided into multiple phases that follow one another in a specific sequence. In order to achieve maximally optimal vehicle stabilization and/or tip-over prevention, a suitable intervention strategy and intervention intensity must be provided by the control unit for each of these phases; a hybrid state machine is suitable for implementing them.

FIG. 1 depicts the overall system. The driver, labeled 100, stipulates variables such as the steering angle, accelerator pedal position, and braking pressure, which are delivered to vehicle stabilization system 101. Vehicle stabilization system 101 contains a portion 102 of the control unit that is responsible for tip-over prevention; and a production-standard vehicle dynamics regulation system 103.

The state variables and output variables of portion 102 of the control unit are made up of a discrete portion and a continuous portion; the input variables are exclusively continuous in nature. The discrete dynamics D and continuous dynamics C are connected via suitable interfaces.

Control unit 101 forwards signals 104 to the wheel brakes, and signals 105 to the engine control unit, of vehicle 107. As a result thereof, and of the corresponding driver input, vehicle 107 enters driving state 106; the signals—e.g. yaw rate or transverse acceleration—sensed with sensors are fed back to the ESP portion of control unit 103.

Figure 2:
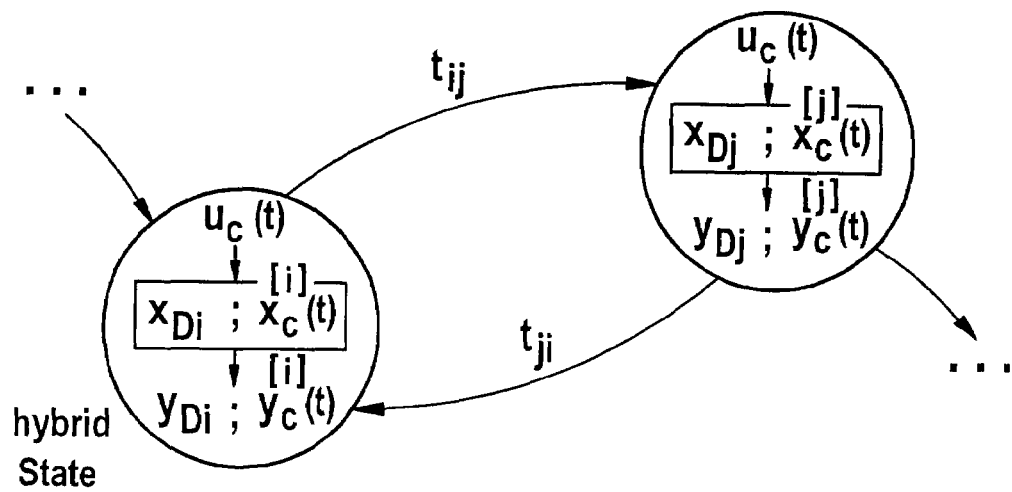
FIG. 2 is a schematic graphical depiction of two states of a state machine and their transition.

One possible graphical depiction of portion 102 is shown in FIG. 2. States 1, 2, . . . , n (each characterized by the vector $X_{D1}$, $X_{D2}$, . . . , $X_{Dn}$ of the system variables) identify the various phases during a highly dynamic steering maneuver, i.e. the discrete classes. One possible subdivision yields, for example, the following classes:

State 1=base state: No tip-over stabilization required.

State 2=pre-filling state: Based on the initial vehicle reaction to a large steering-input action by the driver, preparation is made for the subsequent stabilization intervention.

State 3=holding state: The high transverse acceleration occurring as a result of vehicle reaction to the driver input is limited.

State 4=steering-back state: If steering back by the driver results in a decrease in transverse acceleration but at the same time a large increase in transverse acceleration with the opposite sign may be expected, the previous intervention is terminated in metered fashion and the subsequent stabilization intervention is prepared for.

State 5="rebound" state: The high transverse acceleration once again resulting from the driver input (with the opposite sign as compared to state 3) is limited.

In order to shorten the brakes' response time, in states 2 and 4 a preparation pressure (at a low level) is established at a wheel brake of a wheel at which an intervention for tip-over stabilization is expected shortly.

The variables $t_{ij}$ characterize conditions for the transition from state i to state j. The transition $t_{ij}$ takes place, for example, when one or more continuous variables exceed corresponding limit values. For example, after a large increase (brought about by the driver) in the steering angle and a change in the difference between the actual yaw rate and target yaw rate, a transition from the base state to the pre-filling state takes place. A further increase in transverse acceleration subsequent thereto generally results in oversteering of the vehicle, and thus causes a transition from the pre-filling state to the holding state. During the holding state, an algorithm is used to monitor whether the transverse acceleration is still substantially changing below the tip-over-critical limit. If that is not the case, it is possible either to return to the base state or to ensure, by way of a specific regulation of wheel slip, that severe understeering of the vehicle is prevented (without triggering another rise in transverse acceleration by premature termination of the intervention). If, however, a large counter-steering movement by the driver is identified during the holding state, a transition then occurs into the steering-back state, in which a specific regulation method, adapted to the transition to the vehicle's motion in the opposite direction, is applied.

If it is inferred from the vehicle's motion that a high transverse acceleration will follow, this causes a transition into the "rebound" state, which is associated in turn with a suitable intervention to limit the transverse acceleration.

Discrete output signals YDi of the hybrid state machine can be used to influence other parts of the vehicle stabilization system that do not serve for tip-over prevention. This can involve, for example, in the case of a tip-over-critical situation, activation of the yaw-rate regulator that was previously deactivated by the driver.

In FIG. 2, $x_c^{[i]}(t)$ designates the vector of continuous, time-dependent variables of the brake-slip and braking-torque regulation strategy as a function of the discrete state i; i stands for the number of the state that is characterized by the pair $(x_{Di}, X_c^{[i]}(t))$.

$u_c$ designates the continuous input signals for the state machine, these being the steering angle established by the driver, the transverse acceleration, the yaw rate, the longitudinal velocity, the skew angle, or further variables derived therefrom, for example the transverse acceleration target value calculated in accordance with the Ackermann equation.

$y_c$ designates continuous output signals, for example the target braking torque or target brake slip of the wheels on the outside of the curve. For large counter-steering actions in the context of lane-change maneuvers, a predictive braking torque regulation intervention at the wheels on the inside of the curve, in particular a pre-filling of the wheel brake cylinders, is initiated.

The state machine depicted here can easily be expanded beyond the states 1 to 5 depicted, in order to identify other driving situations such as, for example, slaloming.

With the enhancement depicted, an ESP system can react even more precisely in tip-over-critical situations, in a manner adapted both to the driver's input and to the vehicle's behavior.

Figure 3:
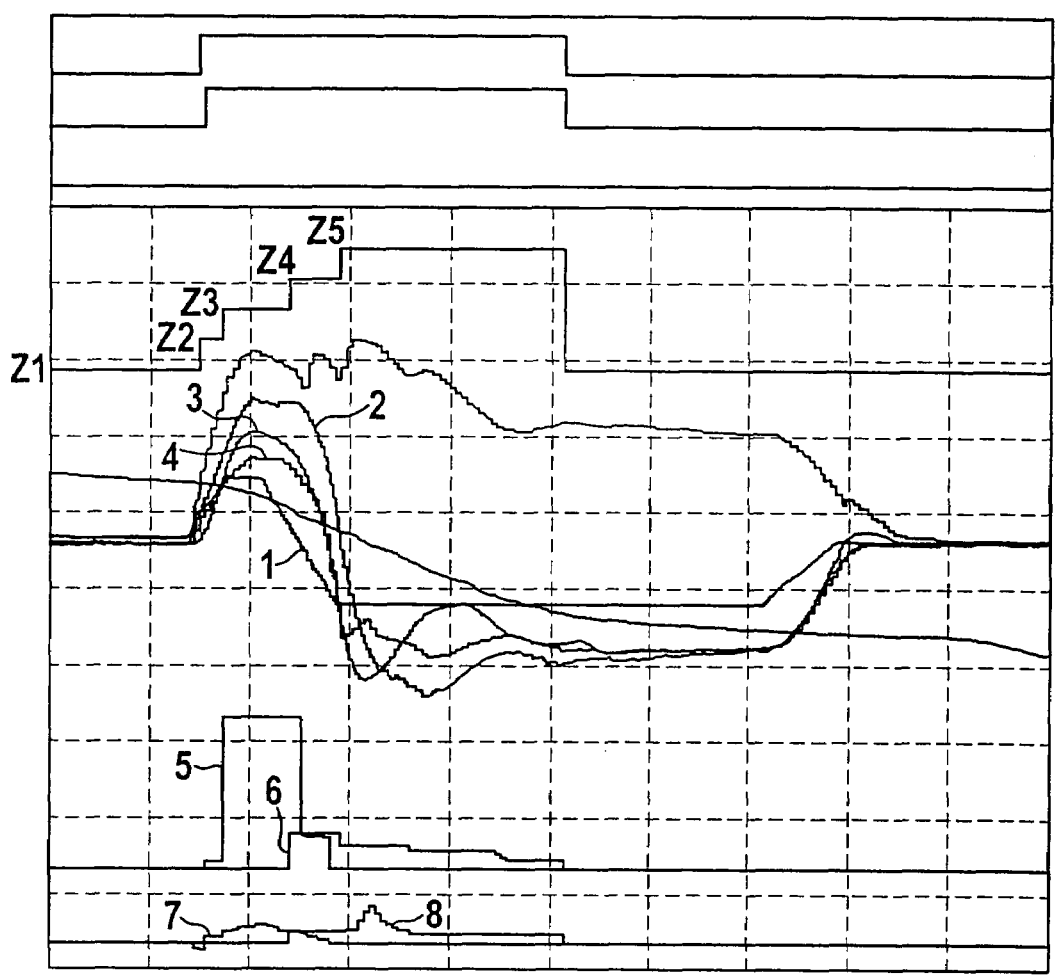
FIG. 3 shows the change over time in several relevant variables in a highly dynamic driving maneuver.

In FIG. 3, time t is plotted in the abscissa direction and the values of some relevant variables in the ordinate direction, in the context of a driving maneuver defined by the National Highway Traffic Safety Administration (NHTSA) as a "fishhook." In the diagram:

1=change over time in steering angle
2=measured transverse acceleration
3=measured actual yaw rate
4=target yaw rate
5=braking torque at left front wheel
6=braking torque at right front wheel
7=brake slip at left front wheel
8=brake slip at right front wheel.

Z1, Z2, Z3, Z4, and Z5 designate the previously defined states 1 (base state) through 5 ("rebound" state).

Figure 4:
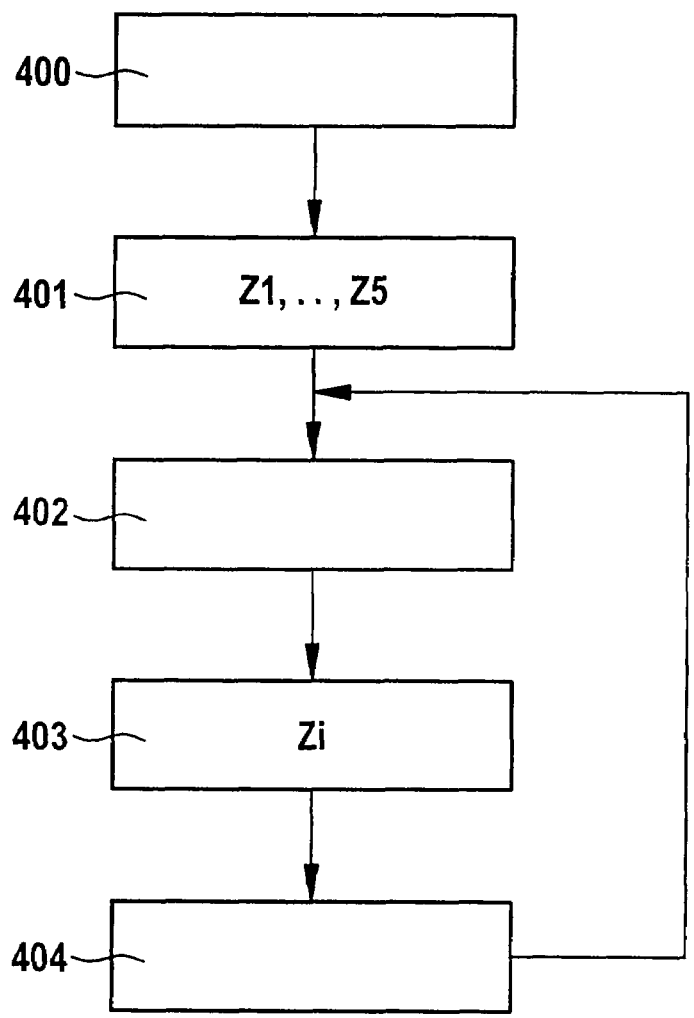
FIG. 4 shows the execution of the method according to the present invention.

Execution of the method according to the present invention is depicted in FIG. 4. After starting in block 400, in block 401 the predefined driving states are determined or are read in or furnished from a memory medium. In block 402 sensor signals are then read in, and in block 403 the present driving state is determined based on the sensor signals and the previous vehicle state. In block 404 braking interventions, for example, take place as a reaction to the present driving state that was determined. These braking interventions change the present vehicle-dynamics variables and thus the sensor signals; a feedback to block 402 therefore occurs, with the sensor signals being read in again.

Figure 5:
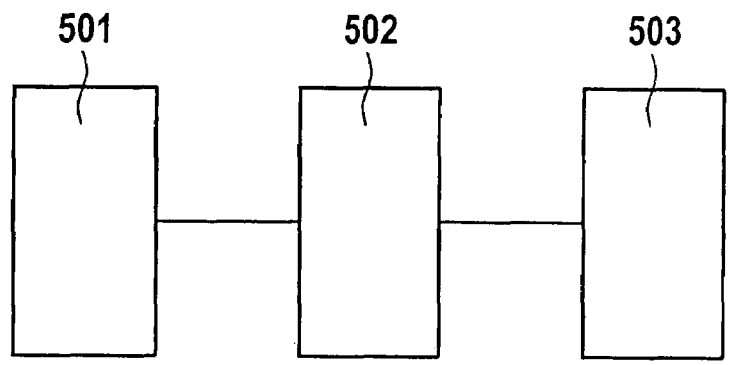
FIG. 5 shows the configuration of the apparatus according to the present invention.

The configuration of the apparatus according to the present invention is depicted in FIG. 5. Block 501 identifies the sensor means for sensing vehicle-dynamics variables. Block 502 contains driving-state determining means with which a determination is made as to which of the predefined driving states the vehicle is in instantaneously, the predefined driving state thus determined being dependent on the sensor signals determined with sensor means 501 and on the predefined driving state in which the vehicle was most recently. Block 503 contains actuator means or braking means with which, as a function of the predefined driving state instantaneously present, at least one braking intervention is carried out in order to prevent the tip-over.

What is claimed is:

1. A method for preventing a tip-over of a motor vehicle in a lateral direction, comprising:
   specifying a finite number of at least three predefined sequential driving states associated with steering maneuvers based on sensor signals characterizing a driver input and a vehicle reaction to the driver input;
   determining which of the predefined driving states the vehicle is in instantaneously, the determined, predefined driving state being dependent on the sensor signals, wherein each change in predefined driving states responsive to a change in at least one sensor signal is restricted to an adjacent driving state in the sequence; and
   performing, as a function of the predefined driving state instantaneously present, at least one braking intervention linked to the instantaneously present driving state to prevent the tip-over;
   wherein the at least three predefined sequential driving states include at least three of the following states: (1) a base state requiring no tip-over stabilization; (2) a pre-filling state in which a preparation is made for a subsequent stabilization intervention based on an initial vehicle reaction to a large steering-input action by a driver; (3) a holding state in which a high transverse acceleration occurring as a result of a vehicle reaction to a driver input is limited; (4) a steering-back state in which a steering back by the driver results in a decreased transverse acceleration while an opposite-signed large transverse acceleration increase is expected; and (5) a rebound state in which another high transverse acceleration occurring as a result of another vehicle reaction to another driver input is limited.

2. The method as recited in claim 1, wherein the sensor signals include sensor signals describing vehicle-dynamics variables.

3. The method as recited in claim 2, wherein the sensor signals correspond to at least one of a yaw rate, a transverse acceleration, a steering angle, and a wheel rotation speed.

4. The method as recited in claim 2, wherein the sensor signals correspond to an accelerator pedal position stipulated by a driver, and a brake pre-pressure stipulated by the driver.

5. The method as recited in claim 1, further comprising:
   in at least one of the predefined driving states, braking, in a cornering situation, a front wheel on an outside of a curve.

6. The method as recited in claim 1, wherein in at least one of the predefined driving states, a pre-filling of at least one wheel brake cylinder takes place, without an appreciable braking effect having yet been applied.

7. The method as recited in claim 1, wherein the predefined states are included as states of a state machine that is expandable to identify other driving situations.

8. An apparatus for preventing a tip-over of a motor vehicle in a lateral direction, comprising:
   an arrangement for specifying a finite number of at least three predefined sequential driving states associated with steering maneuvers based on sensor signals characterizing a driver input and a vehicle reaction to the driver input;
   a sensor arrangement for sensing vehicle-dynamics variables;
   a driving state determining arrangement for determining which of the predefined driving states the vehicle is in instantaneously, the predefined driving state thus determined being dependent on the sensor signals, wherein each change in predefined driving states responsive to a change in at least one sensor signal is restricted to an adjacent driving state in the sequence; and
   a braking arrangement with which, as a function of the predefined driving state instantaneously present, at least one braking intervention linked to the instantaneously present driving state is carried out to prevent the tip-over;
   wherein the at least three predefined sequential driving states include at least three of the following states: (1) a base state requiring no tip-over stabilization; (2) a pre-filling state in which a preparation is made for a subsequent stabilization intervention based on an initial vehicle reaction to a large steering-input action by a driver; (3) a holding state in which a high transverse acceleration occurring as a result of a vehicle reaction to a driver input is limited; (4) a steering-back state in which a steering back by the driver results in a decreased transverse acceleration while an opposite-signed large transverse acceleration increase is expected; and (5) a rebound state in which another high transverse acceleration occurring as a result of another vehicle reaction to another driver input is limited.

9. The apparatus as recited in claim 8, wherein the sensor signals are processed in a hybrid state machine using both driver inputs and the sensed vehicle-dynamics variables to transition between the predefined driving states.

10. The apparatus as recited in claim 8, wherein the sensor signals include sensor signals describing vehicle-dynamics variables.

11. The apparatus as recited in claim 10, wherein the sensor signals correspond to at least one of a yaw rate, a transverse acceleration, a steering angle, and a wheel rotation speed.

12. The apparatus as recited in claim 10, wherein the sensor signals correspond to an accelerator pedal position stipulated by a driver, and a brake pre-pressure stipulated by the driver.

13. The apparatus as recited in claim 8, wherein in at least one of the predefined driving states, in a cornering situation, a front wheel is braked on an outside of a curve.

14. The apparatus as recited in claim 8, wherein in at least one of the predefined driving states, a pre-filling of at least one wheel brake cylinder takes place, without an appreciable braking effect having yet been applied.

15. The apparatus as recited in claim 8, wherein the predefined states are included as states of a state machine that is expandable to identify other driving situations.

16. The apparatus as recited in claim 8, wherein only sensors contained in a vehicle dynamics regulation system determine the predefined driving state, wherein the sensor signals include sensor signals describing vehicle-dynamics variables, and wherein the predefined states are included as states of a state machine that is expandable to identify other driving situations.

17. The apparatus as recited in claim 16, wherein the sensor signals correspond to at least one of a yaw rate, a transverse acceleration, a steering angle, and a wheel rotation speed.

18. The apparatus as recited in claim 16, wherein the sensor signals correspond to an accelerator pedal position stipulated by a driver, and a brake pre-pressure stipulated by the driver.

19. The apparatus as recited in claim 16, wherein in at least one of the predefined driving states, in a cornering situation, a front wheel is braked on an outside of a curve, and wherein in at least one of the predefined driving states, a pre-filling of at least one wheel brake cylinder takes place, without an appreciable braking effect having yet been applied.

20. The method as recited in claim 1, wherein only sensors contained in a vehicle dynamics regulation system determine the predefined driving state, wherein the sensor signals include sensor signals describing vehicle-dynamics variables, and wherein the predefined states are included as states of a state machine that is expandable to identify other driving situations.

21. The method as recited in claim 20, wherein the sensor signals correspond to at least one of a yaw rate, a transverse acceleration, a steering angle, and a wheel rotation speed.

22. The method as recited in claim 20, wherein the sensor signals correspond to an accelerator pedal position stipulated by a driver, and a brake pre-pressure stipulated by the driver.

23. The method as recited in claim 20, wherein in at least one of the predefined driving states, in a cornering situation, a front wheel is braked on an outside of a curve, and wherein in at least one of the predefined driving states, a pre-filling of at least one wheel brake cylinder takes place, without an appreciable braking effect having yet been applied.

* * * * *

UNITED STATES PATENT AND TRADEMARK OFFICE
CERTIFICATE OF CORRECTION

PATENT NO.       : 8,712,659 B2
APPLICATION NO.  : 11/659907
DATED            : April 29, 2014
INVENTOR(S)      : Kieren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1888 days.

Signed and Sealed this

Twenty-ninth Day of September, 2015

Michelle K. Lee
*Director of the United States Patent and Trademark Office*